(12) United States Patent
Simmons et al.

(10) Patent No.: US 8,335,219 B2
(45) Date of Patent: Dec. 18, 2012

(54) SYSTEM AND METHOD FOR ROUTER DATA DISTRIBUTION

(75) Inventors: Steve M. Simmons, Dallas, TX (US); Jim Kleiner, Dallas, TX (US); Qiang Li, Plano, TX (US); Bing Liu, Richardson, TX (US); Lance Arnold Visser, Dallas, TX (US)

(73) Assignee: Foundry Networks, LLC, San Jose, CA (US)

( * ) Notice: Subject to any disclaimer, the term of this patent is extended or adjusted under 35 U.S.C. 154(b) by 433 days.

(21) Appl. No.: 12/333,029

(22) Filed: Dec. 11, 2008

(65) Prior Publication Data
US 2009/0092135 A1 Apr. 9, 2009

Related U.S. Application Data

(63) Continuation of application No. 09/954,362, filed on Sep. 17, 2001, now Pat. No. 7,483,433.

(51) Int. Cl.
*H04L 12/28* (2006.01)
*G06F 15/173* (2006.01)

(52) U.S. Cl. .................. 370/395.31; 709/242

(58) Field of Classification Search .......... 709/203, 709/214, 242, 238, 244; 370/254, 255, 351–356, 370/389, 390, 394, 432, 465–467, 395.31
See application file for complete search history.

(56) References Cited

U.S. PATENT DOCUMENTS

| | | | |
|---|---|---|---|
| 5,216,675 A | 6/1993 | Melliar-Smith | |
| 5,410,710 A * | 4/1995 | Sarangdhar et al. | 710/266 |
| 5,519,704 A | 5/1996 | Farinacci | |
| 5,631,907 A | 5/1997 | Guarneri | |
| 5,886,991 A | 3/1999 | Guarneri | |
| 6,097,718 A * | 8/2000 | Bion | 370/351 |
| 6,477,181 B1 | 11/2002 | Fujimori | |
| 6,496,510 B1 * | 12/2002 | Tsukakoshi et al. | 370/401 |
| 6,577,634 B1 * | 6/2003 | Tsukakoshi et al. | 370/395.31 |
| 6,876,657 B1 | 4/2005 | Brewer | |
| 6,910,148 B1 | 6/2005 | Ho | |
| 6,938,179 B2 | 8/2005 | Iyer | |
| 6,980,537 B1 | 12/2005 | Liu | |
| 7,093,160 B2 | 8/2006 | Lau | |
| 7,236,453 B2 | 6/2007 | Visser | |
| 7,269,133 B2 | 9/2007 | Lu et al. | |
| 7,292,535 B2 | 11/2007 | Folkes | |
| 7,305,492 B2 * | 12/2007 | Bryers et al. | 709/249 |
| 2003/0023701 A1 | 1/2003 | Norman | |

OTHER PUBLICATIONS

Cisco IP Routing Handbook, pp. 22-23, 119-135, 405-406, M&T Books, Copyright 2000.*

(Continued)

*Primary Examiner* — Habte Mered
(74) *Attorney, Agent, or Firm* — Shun Yao; Park, Vaughan, Fleming & Dowler LLP (57) ABSTRACT

Employing an asymmetric protocol, multiple sources reliably broadcast dynamically changing routing tables incrementally across multiple consumers from a single distributor. Each of multiple sources send current tables to the distributor using a snapshot mechanism. Message are buffered, segmented, paced by timers, and broadcast to the consumers repetitively at the distributor. Negative acknowledgments from the consumer request missing messages from the distributor after receipt of a keepalive message from the distributor. The distributor marks the missing messages and retransmits replacements from a history buffer only after firing of a resend timer. A unique Session ID included in all messages originating from each particular source facilitates reliable table distribution from multiple sources to multiple consumers via a single distributor.

21 Claims, 3 Drawing Sheets

OTHER PUBLICATIONS

RFC 2328, OSPF Version 2, Apr. 1998, Network Working Group Request for Comments 2328, pp. 1-122.*

An Efficient Reliable Broadcast Protocol, Kaashok et al, Operating System Review, Oct. 4, 1989.*

Comer, Douglas E. et al., "Internetworking with TCP/IP vol. III: Client-Server Programming and Applications Windows Sockets Version", Prentice-Hall, Inc., Upper Saddle River, NJ (1997), p. 159-175.

* cited by examiner

SYSTEM AND METHOD FOR ROUTER DATA DISTRIBUTION

CROSS-REFERENCES TO RELATED APPLICATIONS

This application is a continuation of U.S. application Ser. No. 09/954,362, filed Sep. 17, 2001, which was related to commonly assigned U.S. patent application Ser. No. 09/703,057, entitled "System and Method for IP Router with an Optical Core," filed Oct. 31, 2000, now abandoned, and commonly assigned U.S. patent application Ser. No. 09/737,646, entitled "System and Method for Router Packet Control and Ordering," filed Dec. 14, 2000, now U.S. Pat. No. 6,876,657, the disclosures of which are hereby incorporated herein by reference.

TECHNICAL FIELD

This Application relates to optical communication networks, and more particularly to reliable distribution of routing table data in a network router.

BACKGROUND

In a router network, consistent routing tables must be distributed from a central point to all of the interface ports of the network. In a unicast distribution mechanism, a single sender sends a message to a single receiver, which may be required to send an acknowledgment to the sender. In a multicast distribution mechanism, a single sender simultaneously sends an identical message to multiple receivers, each of which may be required to return an acknowledgment. The receiver may choose if it wants to see this message, and consequently not all receivers in the network see this message. In a broadcast distribution mechanism, a single sender simultaneously sends an identical message to multiple receivers, none of which can return an acknowledgment. In a multiple source broadcast distribution mechanism, multiple senders simultaneously send multiple messages to multiple receivers, none of which returns an acknowledgment, although each receiver can interpret information from any of the receiver's paths.

A heartbeat mechanism is defined as a consistently timed message between a sender and a receiver. A snapshot is defined as the current image of a table at an instant of time. That is, the image is dynamic and constantly changing.

Additional background information can be found in the following references: "CCIE Professional Development Routing TCP/IP," Vol. 1, MacMillan Technical Publishing, Indianapolis, Ind., 1998; "Routing in the Internet" by Christian Huitema, Prentice Hall, Upper Saddle River, N.J., 2000; and "Internetworking with TCP/IP" by Douglas Comer, Prentice Hall, Upper Saddle River, N.J., 2000.

At all cost, message storms must be prevented. A message storm occurs when communication points saturate, because all resources are spent on processing incoming messages and doing no other work. This could shut down the entire router.

Desired in the art are a method and system for efficiently and reliably distributing and maintaining routing tables in a multiple-source, multiple-receiver communication network environment. Additionally desired are such a method and system that avoid saturation of communication points, thereby preventing message storms.

SUMMARY OF THE INVENTION

The present invention is directed to a protocol among computers within a router network in which some computers are distributors of routing tables, whereas other computers in the network are consumers of the routing tables. The present protocol, referred to as Reliable Table Distribution Protocol (RTDP), is consequently asymmetric. With RTDP, multiple sources can reliably send a consistent yet dynamic image of the routing tables incrementally across multiple consumers using a broadcast mechanism from a single distributor.

RTDP collectively combines the following features: At least one source maintains a copy of the current contents of the routing tables. In some embodiments the source is a copy of Dynamic Routing Protocol (DRP) routing software application, running on a master control processor (MCP) host. Each of the sources can maintain a copy of its own unique routing tables. A unique session ID is included in all messages originating from a particular source. From the source, the current routing table is sent to a single distributor using a snapshot mechanism. In embodiments of the present invention, the distributor is a multi-threaded operating system process or server, which communicates bidirectionally with the source(s) on one thread and bidirectionally with the multiple consumers on a second thread, while timers operate on a third thread. The timers pace the message rates at the distributor, thereby controlling the entire routing table distribution, minimizing message congestion and bandwidth saturation. In the description below, the distributor will be referred to as the RTD Daemon. The sources, consumers, and distributer define a client-server relationship with the distributer as server and the sources and consumers as clients. The consumers are typically packet forwarding modules on the router ports.

Messages are buffered at the distributor and are segmented prior to broadcast to the consumers. The distributor broadcasts three types of messages, namely initialization, update, and keepalive, each controlled by timer intervals that are not integral multiples of one another, to avoid cyclical patterns that can lead to message congestion. Table initialization messages are broadcast repetitively to minimize the probability of a lost message. Incremental table updates are broadcast to the consumers to minimize the use of bandwidth, as opposed to broadcasting the entire table, and are repetitively broadcast to minimize the likelihood of the message being lost. Sequence numbers are included in each message, and are used by the consumer to detect missing and out of order update messages. Negative acknowledgment from the consumer to the distributor is implemented after a consumer detects lost messages and only after receipt of a keepalive message from the distributor. The distributor marks messages in a history buffer corresponding to the missing sequence numbers. Retransmission to replace lost messages from the distributor to the consumer is broadcast only after the firing of a resend timer, to help enforce a consistent image across all of the consumers. Tables are maintained by multiple sources and distributed by a single distributor, providing redundancy and/or segmentation of the network. A heartbeat mechanism, i.e., keepalive messages, is implemented to enforce consistency among all agents. A snapshot mechanism on the distributor guarantees that the distributor maintains only one copy of the tables, while initializing multiple ports.

U.S. Pat. No. 5,886,991 entitled "System and method for quickly distributing program updates in a distributed architecture processing system," and U.S. Pat. No. 5,631,907 entitled "Reliable broadcast protocol structure for electronic software distribution," describe a central location for broadcasting using both unicasting and multicasting. U.S. Pat. No. 5,216,675 entitled "Reliable broadcast protocol," supports a symmetrical protocol, where there is an implied dependency that subsequent messages arrive to detect sequence numbers skewing. U.S. Pat. No. 5,519,704 entitled "Reliable transport protocol for internetwork routing," uses both broadcast and multicast mechanisms. U.S. Pat. No. 6,097,718 entitled "Snapshot Routing with Route Aging," describes aging of the routing tables, maintaining snapshots, and sending message based on that aging.

Although all of the above patents describe variations of a reliable broadcast protocol, none of these protocols support an application in which an extremely dynamic image is broadcast. That is, the routing table for a core router is constantly changing with an estimated 4,000 updates/second. Any application with such a dynamic image introduces among other problems the following which are addressed in embodiments of the present invention:

Updates may arrive while the original image is being initialized.

Too many messages from both consumers and distributors may create a storm and take the entire network down.

Too many received messages by the consumer prevent the consumer from doing any real work.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

TABLES

Table 1A is a state table for a Distribution Broadcast State Machine maintained by RTD Daemon concurrently for each DRP agent in the system; and Table 1B is a state table for the Consumption State Machine, in accordance with RTDP protocol.

DETAILED DESCRIPTION

Routing tables define the destination of every data packet as it arrives, and are centrally maintained on a Master Control Processor (MCP) by a routing protocol application, typically the Dynamic Routing Protocol (DRP) application, and are then distributed to packet forwarding engines within packet forwarding modules (PFMs), located at each of the router ports. In some embodiments, a network processor separates functionality. The network processor has two components, namely FACET and MIPS. Simple packets that can be handled quickly are forwarded on FACET processors, while more complex packets that are handled more slowly are processed on the MIPS host processor. All packets containing Reliable Table Distribution (RTD) messages are handled on the MIPs host processor, which updates the forwarding table that is in memory shared between FACET and MIPs processors. The forwarding table defines how to route incoming packets from other routers. In this context, forwarding table and routing are synonymous. The MIPs host processor has the responsibility of maintaining and updating the routing tables. FACET processors then use these tables to forward the data packets to the correct port. Maintenance of these tables by the routing Border Gateway Protocol (BGP) is dynamic. All ports (up to 1280) on a router have identical copies of the routing tables. Unicasting each routing table to the PFM at every port is inefficient, because there are so many ports. Accordingly, a broadcast mechanism is used to send the tables from the MCP to the port. However, since table updates must arrive accurately at each designated location, a reliable broadcast protocol must be used.

Reliable Table Distribution Protocol (RTDP) in accordance with the present invention includes each of the following elements: sequence numbers, session IDs, messages, and state machines. RTDP defines entities, including session as an instance of the protocol, snapshots as shared copies of large tables, and image as consistent data, for example a complete routing table, that is distributed by a central RTD Daemon and received by each port. Replication of a message increases the likelihood of correct transmission.

Figure 1:
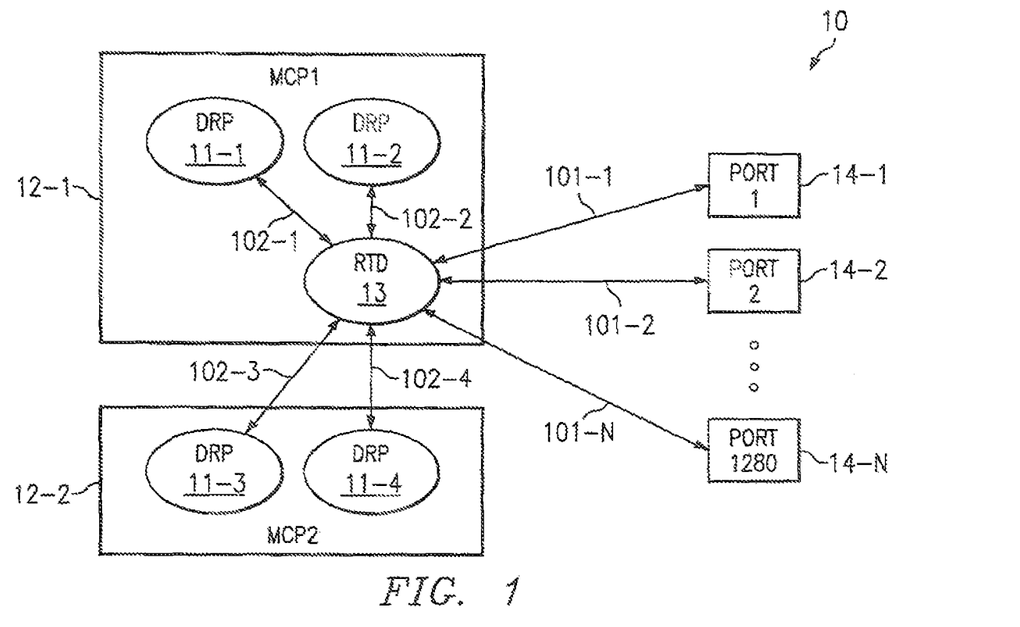
FIG. 1 is a high level block diagram representing a router system 10 incorporating RTDP protocol, in accordance with an embodiment of the present invention.

FIG. 1 is a high level block diagram representing a router system 10 incorporating RTDP protocol, in accordance with an embodiment of the present invention. There are three different types of agents in the RTDP protocol, namely Dynamic Routing Protocol (DRP) application 11-1 through 11-4, running on different Master Control Processor (MCP) platforms 12-1, 12-2; RTD Daemon 13, also referred to as the Distributor; and multiple ports 14-1, 14-2, . . . , 14-N, also referred to as Consumers. In this router system there can be as many as 1280 ports, but there is only one active Distributor RTD Daemon 13, which is an agent running on MCP-1 platform 12-1 in FIG. 1. RTD Daemon 13 is a multi-threaded server using basic client-server techniques, as described for example in "Internetworking with TCP/IP, Volume III, Client-Server Programming and Applications", Douglas E. Comer and David Stevens, Prentice-Hall Inc., Upper Saddle River, N.J. 1997, pages 157-175, having as clients DRP applications, i.e., multiple source DRP applications 11-1 through 11-4, and multiple Consumer ports (i.e., line cards) 14-1, 14-2, . . . , 14-N. RTD Daemon 13 communicates on one thread bidirectionally through internal RNET data paths 101-1, 101-2, . . . , 101-N with all of respective ports 14-1, 14-2, . . . , 14-N, and on another thread bidirectionally through data paths 102-1 through 102-4 respectively with for example up to four individual DRP applications 11-1 through 11-4. A third thread is a timer thread, described below in more detail.

RTDP is an asymmetric protocol, in that each of the above three agents can send some but not all of the messages in the overall protocol. Entire router system 10 can be controlled by RTD Daemon 13, which manages the stability of router system 10 by pacing the messages at RTD Daemon 13 by using timers. In operation, DRP application 11-1 through 11-4 maintains the current contents of the routing table, and it communicates all changes in the routing table to RTD Daemon 13 through data paths 102-1 through 102-4, which use a reliable TCP/IP stream socket connection. In some embodiments, each of DRP applications 11-1 through 11-4 can exist in a separate virtual router partition having its own set of routing tables. Routing table messages communicated from DRP applications 11-1 through 11-4 to RTD Daemon 13 contain a unique session identifier associated with each specific source DRP application 11-1 through 11-4 that sent it. Routing table messages can be sent concurrently by all DRP applications 11-1 through 11-4. RTD Daemon 13 then repackages and broadcasts all of the changes in the routing table in messages including the session identifier of the respective source DRP application to all of the consumer ports 14-1, 14-2, . . . , 14-N through data paths 101-1, 101-2, . . . , 101-N, which are an unreliable medium. Therefore RTD Daemon 13 cannot assume that ports 14-1, 14-2, . . . , 14-N receive the broadcast messages.

Figure 2:
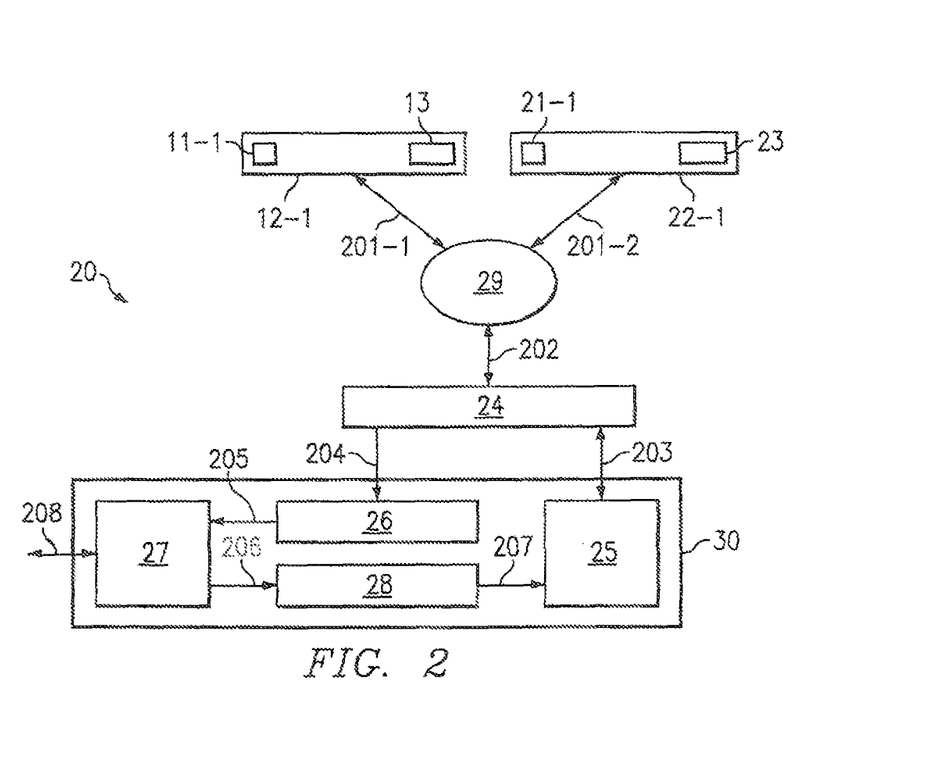
FIG. 2 is a block diagram illustrating in more detail RTDP communication over internal RNET, according to an embodiment of the present invention.

FIG. 2 is a block diagram illustrating in more detail RTDP communication over internal RNET 20, according to an embodiment of the present invention. Additional description of RNET architectures can be found, for example, in co-pending and commonly assigned U.S. patent application Ser. No. 09/703,057, entitled "System and Method for IP Router with an Optical Core," filed Oct. 31, 2000, and co-pending and commonly assigned U.S. patent application Ser. No. 09/737,646, entitled "System and Method for Router Packet Control and Ordering," filed Dec. 14, 2000, the disclosures of which have been incorporated herein by reference. Active MCP platform 12-1 runs RTD Daemon 13 and DRP applications copies 11-1 through 11-N, described above in connection with FIG. 1. Inactive MCP platform 22-1 runs backup copies RTD Daemon 23 and DRP applications copies 21-1. Port 30 incorporates ingress ASIC 25, egress ASIC 26, facility ASIC 27, and packet forwarding engine (PFE) 28. PFE 28 actually performs routing table instructions and is the destination within port 30 for routing table broadcast messages from RTD Daemon 13.

In some embodiments, multiple RTD Daemons exist simultaneously to support update of messages where RTD 13 may be sending messages with a different format from those in RTD 23. RTD daemons 13 and 23 respectively are interconnected bidirectionally through RNET data paths 201-1 and 201-2 with gigabit Ethernet hub 29, which in turn is interconnected bidirectionally through RNET data path 202 with arbitration interface manager (AIM) 24. AIM 24 in turn interconnects bidirectionally through RNET data path 203 with ingress ASIC 25 and unidirectionally through RNET data path 204 with egress ASIC 26. Egress ASIC 26 interconnects unidirectionally through link 205 with facility ASIC 27, which communicates bidirectionally, for example through network data path 208, with a peer network router (not shown in FIG. 2). Facility ASIC 27 is interconnected unidirectionally through link 206, PFE 28, and link 207 with ingress ASIC 25. This describes the messaging structure necessary for RTDP communication over RNET 20. The communication paths between MCP 12-1, 22-1 and PFE 28 are asymmetrical, in that messages flowing from PFE 28 to MCP 12-1, 22-1 take a path different from those flowing from the MCP 12-1, 22-1 to the PFE 28. With each flow, a different set of headers and addressing must be used.

Figure 3:
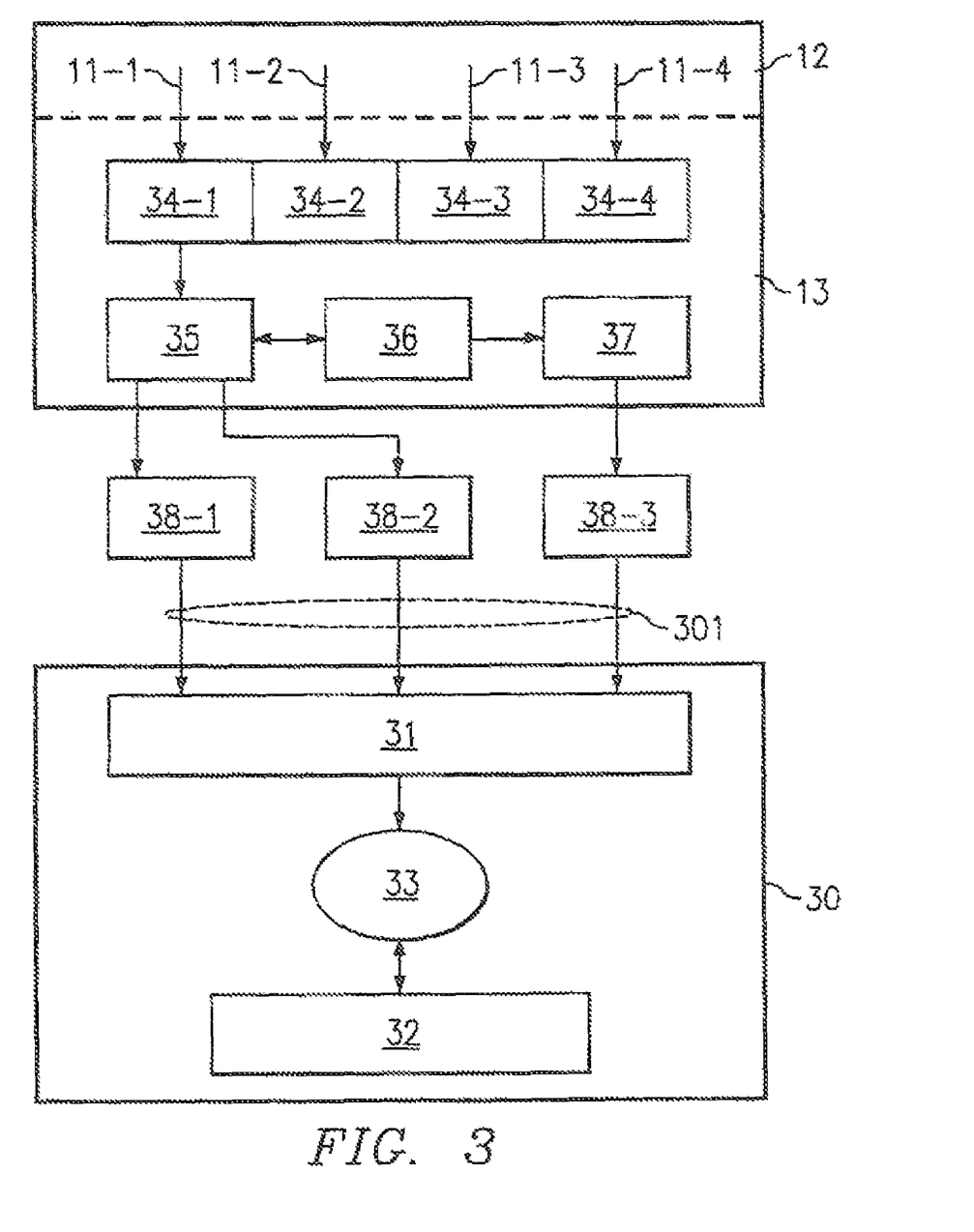
FIG. 3 is a high level diagram illustrating schematically the interrelationships among elements of a port and elements of an MCP within the RTDP protocol.

FIG. 3 is a high level diagram illustrating schematically the interrelationships among elements of port 30 and elements of MCP 12 within the RTDP protocol. DRP Dynamic Routing Protocol agents 11-1 through 11-4 are operating system processes determining and maintaining the layout of the routing table. MCP 12 is a physical hardware device that contains both DRP 11-1 through 11-4 and the RTD Daemon 13. RTD Daemon 13 is an operating system process that controls the flow of messages through RNET 301. RTD Daemon 13 can support one or more DRP agents.

Each DRP agent 11-1 through 11-4 is assigned a respective buffer 34-1 through 34-4 within RTD Daemon 13. Buffers 34-1 through 34-4 within RTD Daemon 13 receive and store all update messages from DRP 11-1 through 11-4. UPDATE Timer 35 is a thread within RTD Daemon 13 that fires at regular intervals (typically about 100 msec). UPDATE Timer 35 takes stored messages from buffers 34-1 through 34-4, and formats them into update messages 38-1 through 38-3, which are both stored in history buffer 36 and broadcast to ports 30 over RNET 301. UPDATE Timer 35 also has the responsibility of repetitively sending each update message at least 3 times, each on a different timer interval. It is significant that each repeated message be sent on different timer intervals, so that temporary noise in the network can clear at later timer intervals, increasing the likelihood of the message being received. History Buffer 36 preserves the last n updates, where in the present embodiment n equals 1024 and is equivalent to 34 seconds worth of updates. History buffer 36 is used by UPDATE Timer 35 for repetitively rebroadcasting a message and by RESEND Timer 37 for resending those messages that have been negatively ACK'ed (SACK NACK'ed) by port 30. That is, when port 30 detects that TABLE UPDATE messages are out of sequence, it must send a SACK NACK message back to RTD Daemon 13 with a list of sequence IDs of messages to be resent. RTD Daemon 13 marks those messages in history buffer 36 for resend. When RESEND Timer 37 fires, RTD Daemon 13 rebroadcasts those messages.

Update messages 38-1 through 38-3 are broadcast messages that each contain a sequence identifier, such that the message can be received out of order on port 30, which then reorders the messages based on the sequence identifiers. Upon arriving, the update messages to 38-1 through 38-3 sequence identifiers are compared against the next expected sequence identifier value. If the sequence identifier equals the next expected value, then the update is immediately applied by table manager 33 within port 30 to routing table 32, which contains the current image to be used by packet forwarding engine 28 in port 30 for forwarding data packets over the network. If the sequence identifier is greater than the next expected value, the update is placed onto update queue 31. If the sequence number is less than the next expected value, then the message has already been received and so is discarded.

In operation, DRP 11-1 through 11-4 sends a message to RTD Daemon 13 containing either a table initialization or prefix update. These messages are stored in buffers 34-1 through 34-4 internal to RTD Daemon 13. Then, the timer thread fires independently on regular timing intervals. The timer thread manages several different timing intervals, described in more detail below, which for purposes of load balancing cannot be integral multiples of one another. If it is a TABLE INIT timer, then the timer thread retrieves the next segment in the stored snapshot and broadcasts a TABLE INIT message to ports 30. If it is a TABLE UPDATE timer, the timer thread takes the current buffered updates from DRPs 11-1 through 11-4. Then, it builds and broadcasts a TABLE UPDATE message. However, it also stores the TABLE UPDATE message in history buffer 36 for later recall. Each TABLE UPDATE message is stamped with a sequence identifier. Additionally, the TABLE UPDATE timer rebroadcasts the two immediately previous TABLE UPDATE messages, such that each TABLE UPDATE is rebroadcast at least 3 times to ports 30.

If it is a KEEPALIVE timer, the current sequence identifier is inserted in a KEEPALIVE message, which is broadcast to ports 30. If it is a PURGE SNAPSHOT timer, the timer thread checks to see if RTD Daemon 13 has received any PORT UP requests over the previous two TABLE INIT intervals. If so, RTD Daemon 13 sends a GET SNAPSHOT message to DRP 11-1 through 11-4. If no PORT UP has been received in the previous two TABLE INIT intervals, RTDP assumes that all ports are initialized, and no more TABLE INIT messages are sent. A significant amount of bandwidth is freed upon reaching the ESTABLISH state, described below in more detail, and it can be used for other applications. If it is a TABLE RESEND timer, the timer thread checks to see if any messages in history buffer 36 are marked for resend. If so, those marked messages are rebroadcast to all ports 30 and thereafter become unmarked in history buffer 36. Concurrently, ports 30 can also send messages back to RTD Daemon 13. These messages can be either PORT UP messages or SACK NACKs. Again, a PORT UP tells a PURGE SNAPSHOT timer to send a new GET SNAPSHOT request to DRP 11-1 through 11-4. A SACK NACK message contains a list of sequence identifiers for missing TABLE UPDATE messages. Each TABLE UPDATE message in history buffer 36 having a sequence identifier in the SACK NACK message is marked for resend, and the TABLE RESEND timer will resend it at the next timer interval. Importantly, TABLE RESEND timer dampens the effect of all ports happening to request the same update, because the update would be broadcast only once rather than once for each requesting port.

Communication between RTD Daemon 13 and DRP applications 11-1 through 11-4 takes place through a TCP stream socket with guaranteed reliable delivery in the form of the following messages:

DRP to RTD Daemon

I'M READY message is exchanged at the beginning of a connection, and informs the RTD Daemon about the Session ID and the location of the DRP client.

TABLE SNAPSHOT message sends the contents of a routing table at an instant of time.

PREFIX UPDATE message sends an incremental update of the routing table.

RTD Daemon to DRP

I'M READY is purely an information message from RTD informing DRP about basic versioning information.

GET SNAPSHOT is an asynchronous request to DRP to send a TABLE SNAPSHOT message of the current routing table.

Communication between RTD Daemon 13 and Ports 14-1, 14-2, . . . , 14-N takes place over unreliable RNET data paths.

RTD Daemon to Port

TABLE INIT message provides routing table initialization to ports 14-1, 14-2, . . . 14-N.

TABLE UPDATE sequence numbered message updates the routing table at ports 14-1, 14-2, . . . , 14-N.

KEEP ALIVE message is paced at periodic timing intervals, in the present embodiment about every 2 seconds, providing a heartbeat mechanism and continually checking the current sequence identifier (see below) at ports 14-1, 14-2, . . . , 14-N.

Port to RTD Daemon

PORT UP message informs RTD Daemon 13 that the port is up and waiting to receive TABLE INIT messages.

SACK NACK message requests RTD Daemon 13 to resend missing broadcast messages, and contains a bit vector defining the sequence identifiers of all messages requested to be resent.

RTD Daemon 13 sends two types of broadcast messages to ports 14-1, 14-2, . . . , 14-N, namely TABLE INIT and TABLE UPDATE. A TABLE INIT message is a portion of a snapshot, which is an image of the routing table at an instant in time. In the present embodiment, the snapshot is divided into segments that can typically fit within 1500 byte packets. In other embodiments RTDP is not limited to using packets for transporting messages. Each RTD message contains the type of message, size of message, current sequence number, and payload checksum. The type of message defines whether it is a TABLE INIT, TABLE UPDATE message, etc. The payload checksum finds intermittent bit errors that may be introduced into a payload during transportation. A TABLE INIT message has a sub-header that contains table type, the segment total, segment identifier, and number of entries within the segment. The segment total is total number of segments, and the segment identifier is the position of the segment within the entire table. The segment identifier and segment total are significant to this protocol, because one port may come online while a table initialization is being broadcast to other ports. A port 14-1, . . . , 14-N uses the segment identifier and segment total to track which portions of the routing table has been received. The order of receiving messages is not important, because the port stores a TABLE INIT message immediately in an internal buffer. Once all segments have been received in the internal buffer, the snapshot is copied as the current routing table. The TABLE INIT message uses the sequence identifier to determine the set of TABLE UPDATE messages to apply. That is, the TABLE UPDATE messages are discarded if their sequence identifier is less than the sequence identifier of the table. Otherwise, the TABLE UPDATE message is queued until all of the TABLE NIT messages have been received.

A TABLE UPDATE message is an incremental (delta) routing table entry message updating a snapshot, that must be applied in the correct time order. Each TABLE UPDATE message contains a sequence identifier that orders the TABLE UPDATE messages. Since a port 14-1, 14-2, . . . , 14-N can receive the TABLE UPDATE messages in any order, it maintains an ordering queue. If a port 14-1, 14-2, . . . , 14-N fails to receive any TABLE UPDATE message, then the port can send a SACK NACK message back to RTD Daemon 13 to request retransmission of the missing TABLE UPDATE message. RTD Daemon 13 maintains copies of previously transmitted TABLE UPDATE messages in a history buffer, from which it retrieves the requested missing TABLE UPDATE messages.

Figure 4A:
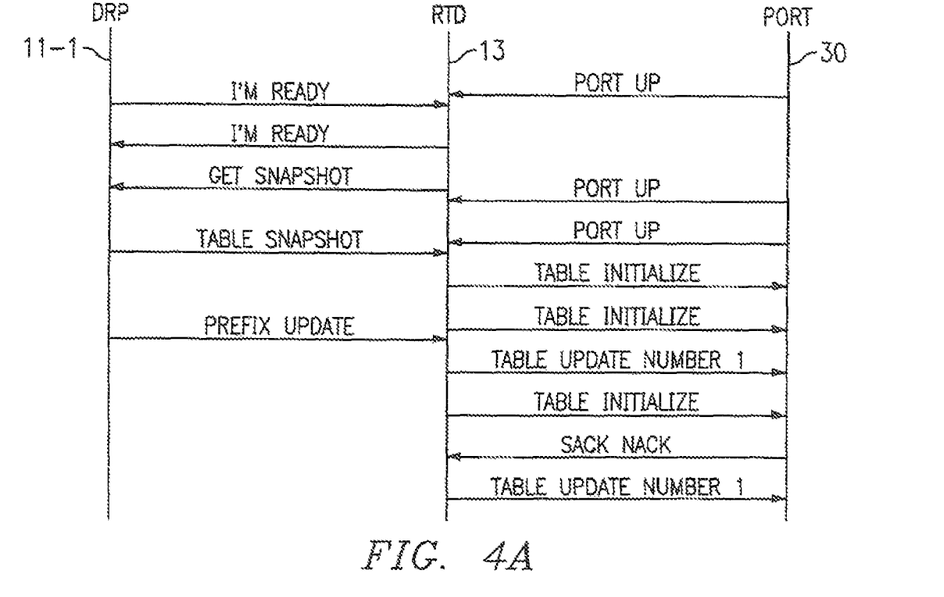
FIGS. 4A and 4B are message flow diagrams relating to different aspects of RTDP protocol.
Figure 4B:
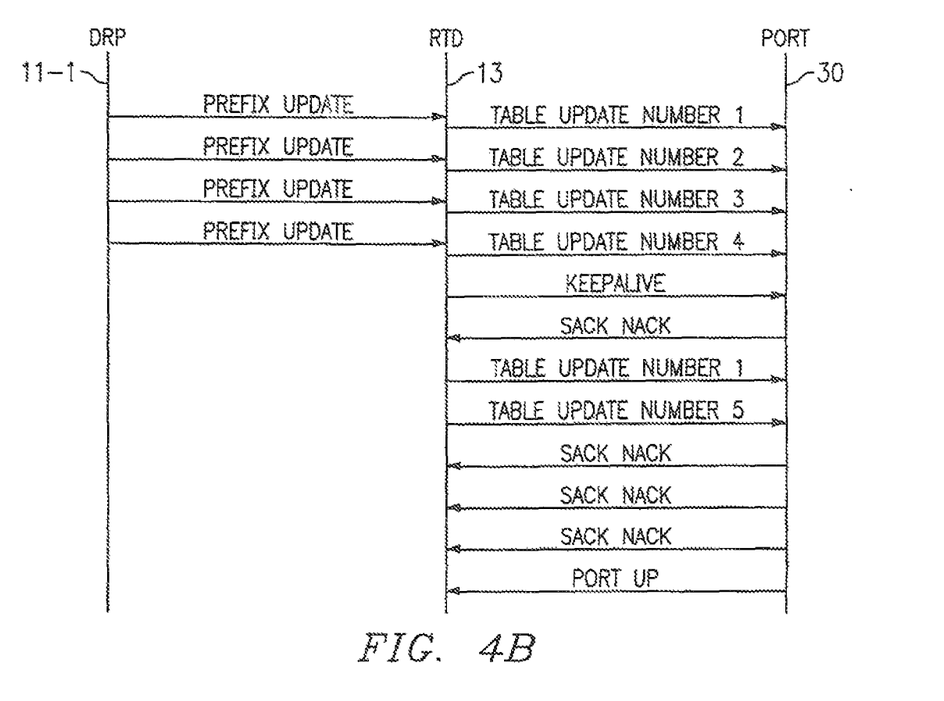

FIGS. 4A and 4B are message flow diagrams relating to different aspects of RTDP protocol. FIG. 4A, which illustrates message flow sequencing in the Table Initialization stage of RTDP, is divided vertically for convenience into messages in the left portion between DRP application, for example DRP 11-1 on the far left and RTD Daemon 13 in the center portion of the diagram, and between RTD Daemon 13 in the center and port 30 on the far right in the diagram. Arrows indicate the directions of the message flows.

In the upper right portion of FIG. 4A, port 30 sees that it is up but there are no forwarding tables. It continually resends PORT UP messages until it receives a TABLE INIT message. In the upper left portion of FIG. 4A, DRP 11-1 sends an I'M READY message, which tells RTD Daemon 13 that it is ready to communicate. RTD Daemon 13 then replies back with an I'M READY message. RTD Daemon 13 sends a GET SNAPSHOT request message to DRP 11-1. Asynchronously, DRP 11-1 sends a TABLE SNAPSHOT message containing routing table contents to RTD Daemon 13.

After receiving TABLE SNAPSHOT message, as shown in the lower right portion of FIG. 4A, RTD Daemon 13 starts broadcasting TABLE INIT messages to ports 30 at regular timer intervals, for example every 20 milliseconds. Port 30 receives the TABLE INIT messages, and stores them into an internal buffer until the entire routing table contents is received. Referring to the lower left portion of FIG. 4A, DRP 11-1 can begin sending PREFIX UPDATE messages to RTD Daemon 13, which can then broadcast TABLE UPDATE messages at regular timer intervals, for example every 90 milliseconds, to ports 30, intermingled with continuing TABLE INIT messages. The various RTDP timer intervals are managed by RTD Daemon 13 for load balancing, such that no timer interval is an integral multiple of any other timer interval. It is significant to the protocol that these intervals are not integral multiples. Otherwise, cyclical patterns can develop, in which certain timer interrupts have too much work. For example, sending both TABLE UPDATES and TABLE RESENDS should rarely be on the same timer interrupt, because it would consume too much time within the interrupt.

If port 30 starts to receive TABLE UPDATE messages before receiving all of the TABLE INIT messages, the TABLE UPDATE messages are queued. After port 30 has received all of the current TABLE INIT messages, it applies the TABLE UPDATE messages in order. If any TABLE UPDATE messages are missing, a SACK NACK message is sent from port 30 to RTD Daemon 13, which subsequently rebroadcasts the requested missing TABLE UPDATE messages.

FIG. 4B illustrates the flow of KEEPALIVE and SACK NACK messages following the same format as in FIG. 4A. DRP 11-1 repetitively sends PREFIX UPDATE messages containing the routing table updates to RTD Daemon 13, which buffers these. RTD Daemon 13 paces these messages at regular timer intervals, for example 90 milliseconds in the present embodiment, and then broadcasts corresponding sequence-numbered TABLE UPDATE messages to ports 30. RTD Daemon 13 also stores each TABLE UPDATE message in history buffer 36.

RTD Daemon 13 broadcasts KEEPALIVE messages to ports 30 at regular timer intervals, which are two seconds apart in the present embodiment. KEEPALIVE messages contain current sequence identifiers. If at a port 30 the difference between the sequence identifier of the KEEPALIVE message and the current known sequence number at port 30 is less than 4, then the KEEPALIVE message is ignored. Otherwise, a SACK NACK message is formed, which contains a bitmask that selectively states which ones of the last 600 messages need to be resent. RTD Daemon 13 receives SACK NACK and marks the requested message needing to be resent. SACK NACK requests need to buffer at RTD Daemon 13, since several ports 30 can request the same message to be resent.

After another timer interval, for example 110 milliseconds, RTD Daemon 13 resends up to 20 marked TABLE UPDATE messages. If RTD Daemon 13 no longer has a requested message in its history buffer, then the message is not sent. Port 30 has its own local timer, and resends the SACK NACK message at regular intervals, typically every two seconds. After three retries, port 30 gives up and sends a PORT UP message, which forces RTD Daemon 13 to start re-initializing the routing table.

There are two Reliable Table state machines maintained within the RTDP protocol, namely Distribution Broadcast in the RTD Daemon and Consumption on the Port. Messages received and timers fired are the two classes of events that force state transitions.

Table 1A is a state table for a Distribution Broadcast State Machine maintained by RTD Daemon 13 concurrently for each DRP agent in the system. The states on the distribution broadcast side are as follows: In the BOUND state, the Table communicates with one DRP agent, but ports do not receive any communication. When transmitting over RNET data paths 101-1, 101-2, . . . , 101-N to ports 14-1, 14-2, . . . , 14-N, RTD Daemon 13 can be in one of two states, namely BROADCAST and ESTABLISH. TABLE INIT messages can be transmitted only when in the BROADCAST state, in which a TABLE INIT message is automatically retransmitted three times. Then RTD Daemon 13 requests a new snapshot from DRP application 11-1 through 11-4 with a GET SNAPSHOT message, meanwhile staying in the BROADCAST state, while PORT UP messages are received from ports 14-1, 14-2, . . . , 14-N that are still coming online. After receiving a TABLE SNAPSHOT from the DRP, the RTD Daemon divides the snapshot into segments. The RTD Daemon then iterates, sending one segment at a time over the RNET. However, it will make three passes over the table. This implies that each segment is sent at least three times; however, the repetitive sending is spread out further than in the TABLE UPDATE messages. This spreading is significant to the protocol, because ports come online at different times during the broadcast, and are consequently more likely to see one of the later broadcasts. When no PORT UP message has arrived during two full TABLE INIT transmits, then the BROADCAST state is exited and the ESTABLISH state is entered. RTD Daemon 13 can re-enter the BROADCAST state if either a PORT UP message arrives or a queue saturation point is reached, as described below in more detail. TABLE UPDATE and KEEPALIVE messages are also sent.

A session ID identifying the DRP sender is inserted in the TABLE INIT and TABLE UPDATE messages by RTD Daemon 13 prior to broadcasting. Each port 30 is configured to recognize only one session ID associated with the virtual router partition to which it belongs, and to ignore all others. Therefore each port receives only its own set of routing table updates and excludes all others.

When RTD Daemon 13 is in the ESTABLISH state, it can send only TABLE UPDATE messages to ports 30, thus freeing up much of the internal RNET bandwidth. TABLE UPDATE messages are sent when in either BROADCAST or ESTABLISH state, and are transmitted three times, separated by regular intervals (for example 90 ms).

TABLE 1A

| | Distribution Broadcast State Machine | | |
|---|---|---|---|
| Events/State | BOUND | BROADCAST | ESTABLISH |
| TABLE SNAPSHOT From DRP | Save Snapshot Goto BROADCAST | Save Snapshot | Save Snapshot Goto BROADCAST |

TABLE 1A-continued

Distribution Broadcast State Machine

| Events/State | BOUND | BROADCAST | ESTABLISH |
|---|---|---|---|
| PREFIX UPDATE From DRP | — | Save Table Update | Save Table Update |
| SACK NACK From Port | — | Mark Update message for Resending | Mark Update message for Resending |
| PORT UP from Port | Send GET SNAPSHOT to DRP. | Reset Purge Snapshot Timer | Send GET SNAPSHOT |
| Update Timer | — | Broadcast TABLE UPDATE to Port | Broadcast TABLE UPDATE to Port |
| Init Timer | — | Broadcast TABLE INIT to Port | — |
| Purge Snapshot Timer | — | Goto ESTABLISH | — |
| Resend Timer | | Resend marked TABLE UPDATE Messages | Resend marked TABLE UPDATE messages. |
| KEEPALIVE Timer | | Send KEEPALIVE message | Send KEEPALIVE message |

Additionally, the UPDATE timer fires every 90 msecs for 360 prefixes, and the Resend Timer fires at 110 msec intervals up to 20 resends. The INIT timer fires every 20 msecs up to 1250 prefixes, and takes 10 seconds to download an entire 250K prefix table snapshot without error. This snapshot is rebroadcast 3 times in 30 seconds. The KEEPALIVE timer fires every 2 seconds, and launches a KEEPALIVE message to port 30. The PURGE SNAPSHOT timer fires every 30 seconds, and removes one copy of a snapshot from RTD Daemon 13. Typically, it also requests a new snapshot from DRP, but stops requesting new snapshots after 3 broadcast interations without a "PORT UP".

In the present embodiment, a saturation point occurs when the RTD has more than 36,000 updates. The RTD would take at least 9 seconds (4,000 updates/sec) to transmit these updates while still receiving more updates from the DRP. Therefore, the RTD detects that it is choking and then requests a new snapshot from the respective DRP. After the snapshot is received, the RTD marks a FORCED BROADCAST bit on the TABLE INIT message, and each port automatically reinitializes its tables.

Table 1B is a state table for the consumption state machine, in accordance with RTDP protocol. A port, for example ports 14-1, 14-2, . . . , 14-N, can be in one of four states: DOWN, SYNC, ESTABLISH and OUT OF SYNC. DOWN implies that the port is not functioning. When in the SYNC state, a port processes only TABLE INIT messages, and TABLE UPDATE messages are loaded into ordering queue 31. Conversely, in the ESTABLISH state, TABLE NIT messages are ignored, and TABLE UPDATE messages are processed. A TABLE INIT message is processed in the ESTABLISH state only if the FORCED BROADCAST bit is set, which forces the port to enter SYNC state again. The FORCED BROADCAST bit is typically set if the DRP is reinitialized or if the RTD has been saturated with updates from the DRP. In the ESTABLISH state, a KEEPALIVE message, discussed below in more detail, informs the port that it is significantly (greater than four TABLE UPDATE messages) behind, at which time the port sends a SACK NACK message to RTD Daemon 13 and enters the OUT OF SYNC state. The SACK NACK message contains a bit vector defining the sequence identifiers of all messages requested to be resent.

In the present embodiment, an inbound packet queue of 600 TABLE UPDATE messages is maintained, corresponding to at least 20 seconds worth of table updates. When receiving a TABLE INIT message in SYNC state, the following checks must be performed: If the message is for current snapshot, mark having received the entry. If all messages for the current snapshot have been received, immediately apply all possible TABLE UPDATE messages from the UPDATE queue 31. Note, the only TABLE UPDATE messages that can be applied are those with consecutive sequential numbers starting immediately after the sequence ID for the TABLE INIT message. If UPDATE queue 31 is empty, go to ESTABLISH state. Otherwise, go to OUT OF SYNC state. If the message is for a later snapshot, discard all updates on the Update Queue and all segments stored for the previous snapshot.

TABLE 1B

Consumption State Table

| Event/State | DOWN | SYNC | ESTABLISH | OUT OF SYNC |
|---|---|---|---|---|
| TABLE INIT from RTD | If (valid) THEN Store in Table; Goto SYNC | IF (valid) THEN Store in Table | — | — |
| TABLE UPDATE from RTD | — | Insert on Queue | IF (out of seq) THEN Insert On Update Queue; ELSE Store In Forwarding Table | IF (needed) THEN Store In Table; Pop Update Queue; Goto ESTABLISH; ELSE Insert On Update Queue |

TABLE 1B-continued

Consumption State Table

| Event/State | DOWN | SYNC | ESTABLISH | OUT OF SYNC |
|---|---|---|---|---|
| KEEPALIVE from RTD | — | — | IF (behind by 4) THEN Send SACK NACK Goto OUT OF SYNC | Resend SACK NACK |
| LOCAL TIMER | Send PORT UP | IF (no messages >2 secs) THEN Send PORT UP; Goto DOWN | — | Resend SACK NACK; After 4 tries Goto DOWN |

For example, internal RNET may have a bit error rate (BER) requirement of $10^{-6}$ The error likelihood of a 1500-byte (12,000 bit) packet transmit is 1.2% (rounding to $10^{-2}$). Because it requires 2800 packets to initialize a 250K entry prefix table in one TABLE INIT iteration, a single port may typically lose 28 packets during initialization. Consequently it is 100% likely that the table is not initialized. After two TABLE INIT transmit iterations, the likelihood of losing the same packet on both iterations is $10^{-4}$, i.e., it is 28% (2800× $10^{-4}$) probable that the table is not initialized. However, in 1000-port system, this would result in 280 incompletely initialized ports. After three TABLE INIT transmit iterations, the probability that the table on any of the ports is not initialized is reduced to 2.8% ($10^{-6}$×2800 packets/port×1000 ports).

After the three iterations of broadcasting, RTD 13 requests a new snapshot from DRP 11-1 through 11-4 and the DRPs send this snapshot asynchronously. This is significant to the protocol, because the previous snapshot has not applied at least 30 seconds worth of updates. This reduces the staleness of the current snapshot. The likelihood of the 2.8 remaining ports not being initialized over the next three iterations is $7.84\times10^{-3}$ ($10^{-6}$×2800 packets/port×2.8 ports). For this reason, RTD Daemon 13 stays in the BROADCAST state for at least one more iteration after the last PORT UP message.

Port 14-1, 14-2, . . . , 14-N still has a safeguard in which it sends a PORT UP when it stays in the SYNC state without receiving a TABLE NIT message over a two-second interval.

If the BER increases to $10^{-5}$, then the likelihood of a failed message is $10^{-1}$ after three TABLE INIT repeat broadcasts. This implies that at least one port will be uninitialized. Therefore, a higher BER implies that more transmit iterations are necessary, for example six repetitions would guarantee performance similar to three repetitions with a BER of $10^{-6}$.

Should the BER decrease to $10^{-7}$, then the likelihood of a failed message on one iteration is $10^{-3}$ or after three iterations is $10^{-9}$. The number of repetitions can be reduced to two and still have $10^{-6}$ packet drop probability, thus freeing up one-third of the RNET bandwidth requirement. Every message is marked with a version. This is significant to the protocol, because each port can be upgraded at different times. The port keys on the version in order to understand the current version of the RTD protocol in use. Then, it decodes and encodes messages based on this version. It does force that all ports run the newer versions of software before the RTD can be upgraded.

Technical Advantages Include:

Scalable Table Sizes: Routing tables are approximately 100K entries. Table sizes can be assumed to be 200K by the year 2002, and may easily grow to 500K within a few years thereafter. It may further be assumed that 1M routing table entries are reasonable within the lifetime of an embodiment of the present invention.

Rapid Updates: BGP updates tables at frequencies of faster than once per second and can potentially support an average 4000 updates/sec with a saturation point of 36,000 prefix entries waiting in a queue. Saturation of the queue is resolved by broadcasting an entire snapshot of a table again.

Consistency across 1280 ports which must have identical forwarding tables that are broadcast.

Virtual Router Support: Several DRPs on the MCP with different routing information. RTDP is responsible for pacing the flow of messages through the Routing Network (RNET). A present embodiment is designed to support up to four copies of DRP.

Predictability of worst case: Message storms that are internal to a router may easily take the router down, and not even the protection network can recover. A crash of a central router can be disastrous and unacceptable in a central office environment. Predictability of a worst case is more important than is optimal performance.

At all costs, message storms must be prevented. A message storm occurs when the communication point saturates, because all resources are consumed on processing incoming messages and doing no other work. This can shut down the entire router. Therefore, the present embodiment of the invention budgeted 3.125 Mbytes/sec. This number was reached because the theoretical maximum is 312.5 Mbytes/sec on the physical links, of which one percent was budgeted for RTD traffic. Using the combination of buffers and timers described above permits an allocation of bandwidth based on different traffic types. That is, each timer is budgeted a specific maximum number of messages that it may send on any single interrupt. This is significant to the protocol, because the stability of the entire system can be controlled based on the frequency of the timer firing on the MCP. As an example, the following are the presently allocated bandwidths:

Table Initialization: 420 Kbytes/second
Table Update: 183 Kbytes/second
Table Resends: 210 Kbytes/second
Table Sack Nacks: 130 byte/second The following are message formats between the DRP and the RTD. These message formats assume an underlying reliable message format.

| +31-30-29-28-27-26-25-24-23-22-21-20-19-18-17-16-15-14-13-12-11-10-09-08-07-06-05-04-03-02-01-00+ | | |
|---|---|---|
| Message size | | |
| Magic Number | Message Type | Version |

Message Size: The size of message.
Magic Number: Used to check that all bytes from message size field has been received.
Message Type: Type of message sent.
Version: Used to support multiple versions of DRP into the RTD.

DRP to RTD

I'm Ready

| +31-30-29-28-27-26-25-24-23-22-21-20-19-18-17-16-15-14-13-12-11-10-09-08-07-06-05-04-03-02-01-00+ | |
|---|---|
| Session Id | Debug Text . . . |

Session Id: The session identifier used for this DRP client's messages.
Debug Text: Text for determining which RTD has been connected.

Prefix Snapshot

| +31-30-29-28-27-26-25-24-23-22-21-20-19-18-17-16-15-14-13-12-11-10-09-08-07-06-05-04-03-02-01-00+ | |
|---|---|
| Element Size | unused |
| Element Number | |
| Prefix Entry . . . | |

Element Size: Size of each prefix entry.
Element Number: Number of elements in the Prefix Entry array.
Prefix Entry: Entry in the prefix table.

Prefix Update

| +31-30-29-28-27-26-25-24-23-22-21-20-19-18-17-16-15-14-13-12-11-10-09-08-07-06-05-04-03-02-01-00+ | |
|---|---|
| Element Size | unused |
| Element Number | |
| Prefix Update . . . | |

Element Size: Size of each update entry.
Element Number: Number of elements in the Prefix Update array.
Prefix Update: Entry in the prefix update.

RTD to DRP

I'm Ready

| +31-30-29-28-27-26-25-24-23-22-21-20-19-18-17-16-15-14-13-12-11-10-09-08-07-06-05-04-03-02-01-00+ | |
|---|---|
| Session Id | Debug Text . . . |

Session Id: The session identifier used for this DRP client's messages.
Debug Text: Text for determining which RTD has been connected.

The following are the message formats on the R-Net.

Distribution Header

| +31-30-29-28-27-26-25-24-23-22-21-20-19-18-17-16-15-14-13-12-11-10-09-08-07-06-05-04-03-02-01-00+ | | | | | |
|---|---|---|---|---|---|
| RTP Version | Type | Table | unused | Sequence Number | |
| Payload Checksum | | | | Session Id | unused |

RTD Version: Current format use. Needed for upgrades.
Type: Type of message, Initialization, Update, etc.
Table: Table to be updated.
Sequence Number: Current sequence.
Payload Checksum: Checksum to verify that no bit errors were introduced.
Session Id: This is the current DRP agent sending message.

Table Initialization

| +31-30-29-28-27-26-25-24-23-22-21-20-19-18-17-16-15-14-13-12-11-10-09-08-07-06-05-04-03-02-01-00+ |
|---|
| Size of Header | Size of Entry | Number of Entries |
| Segment Identifier | F | Segment Total |
| Prefix Entry ... |

Size of the subheader portion.
        Size of each entry.
        Number of each entries in this segment.
        Segment identifier identifies which segment.
        Segment total is total number of segments.
        Array of Prefix Entries to install in the forwarding table.

Table Undate

| +31-30-29-28-27-26-25-24-23-22-21-20-19-18-17-16-15-14-13-12-11-10-09-08-07-06-05-04-03-02-01-00+ |
|---|
| Size of Header | unused | Number of Entries |
| Update Entry ... |

Size of the header.
        Number of entries.
        Array of update entries.

Keepalive

| +31-30-29-28-27-26-25-24-23-22-21-20-19-18-17-16-15-14-13-12-11-10-09-08-07-06-05-04-03-02-01-00+ |
|---|
| Update Sequence | Unused |
| Update Entry ... |

Current Update Sequence number.

Consumption Header:

| +31-30-29-28-27-26-25-24-23-22-21-20-19-18-17-16-15-14-13-12-11-10-09-08-07-06-05-04-03-02-01-00+ |
|---|
| RTD Version | Type | Table | unused | Payload Checksum |

RTD Version: Version of the message.
        Type: Type of message SACK or Port Up.
        Table: Specific table.
        Payload Checksum: Checksum to guard against intermittent bit errors.

SACK NACK

| +31-30-29-28-27-26-25-24-23-22-21-20-19-18-17-16-15-14-13-12-11-10-09-08-07-06-05-04-03-02-01-00+ |
|---|
| Start Sequence Number | Mask Length |
| Window Mask. |

Start Sequence Number: First sequence number in the mask.
        Mask Length: Number of bits in the mask.
        Window Mask: A mask where bit on implies resending the message.

PORT UP

| +31-30-29-28-27-26-25-24-23-22-21-20-19-18-17-16-15-14-13-12-11-10-09-08-07-06-05-04-03-02-01-00+ |
|---|
| IP Address |
| MTU | Unused |

IP Address: Negotiated IP Address.
        MTU: Negotiated Maximum transmission unit size.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A router, comprising:
   one or more virtual routers, each maintaining a dynamic routing protocol application, wherein a respective dynamic routing protocol application is configurable to construct a routing table for the corresponding virtual router;
   one or more line cards;
   a routing table distribution application residing within the router and in communication with the one or more virtual routers and one or more line cards;
   wherein the routing table distribution application is configurable to:
      receive routing table updates from the one or more virtual routers; and
      construct a message containing the received updates to the one or more line cards.

2. The router of claim 1, wherein the dynamic routing application is further configurable to update the routing table.

3. The router of claim 1, wherein the routing table distribution application comprises one or more buffers;
   wherein a respective buffer is configurable to receive routing table updates from a respective virtual router.

4. The router of claim 1, wherein the routing table distribution application comprises one or more timing modules configurable to regulate the distribution of routing table updates.

5. The router of claim 1, further comprising a backup routing table distribution application.

6. The router of claim 1, wherein a respective routing table update comprises a sequence number associated with the corresponding virtual router.

7. The router of claim 1, wherein the routing table distribution application is further configurable to re-broadcast the updates to the one or more line cards to ensure reliable delivery.

8. A method, comprising:
   receiving at a routing table distribution application routing table updates from one or more virtual routers; and
   constructing a message containing the received updates to one or more line cards;
   wherein the routing table distribution application, one or more virtual routers, and one or more line cards are within a router; and
   wherein each virtual router maintains a dynamic routing protocol application configurable to construct a routing table for the corresponding virtual router.

9. The method of claim 8, further comprising updating a routing table within a respective virtual router.

10. The method of claim 8, wherein receiving the routing table updates comprises receiving the routing table updates in one or more buffers;
    wherein a respective buffer is configurable to store routing table updates from a respective virtual router.

11. The method of claim 8, wherein distributing the received updates to the one or more line cards comprises regulating the distribution of routing table updates by using one or more timing modules.

12. The method of claim 8, further comprising distributing the received updates to the one or more line cards by a backup routing table distribution application.

13. The method of claim 8, wherein a respective routing table update comprises a sequence number associated with the corresponding virtual router.

14. The method of claim 8, further comprising re-broadcasting the updates to the line cards by the routing table distribution application to ensure reliable delivery.

15. A computing system, comprising:
    a processor; and
    a non-transitory computer-readable storage medium storing instructions that when executed by the processor cause the computing system to perform a method for distributing routing tables, the method comprising:
       maintaining a respective dynamic routing protocol application configurable to construct a routing table in a respective virtual router;
       receiving at a routing table distribution application routing table updates from one or more virtual routers;
       constructing a message containing the received updates to one or more line cards;
       wherein the routing table distribution application, one or more virtual routers, and one or more line cards are within a router.

16. The computing system of claim 15, wherein the method further comprises updating a routing table within a respective virtual router.

17. The computing system of claim 15, wherein receiving the routing table updates comprises receiving the routing table updates in one or more buffers;
    wherein a respective buffer is configurable to store routing table updates from a respective virtual router.

18. The computing system of claim 15, wherein the method further comprises regulating the distribution of routing table updates by using one or more timing modules.

19. The computing system of claim 15, wherein the method further comprises distributing the received updates to the one or more line cards by a backup routing table distribution application.

20. The computing system of claim 15, wherein a respective routing table update comprises a sequence number associated with the corresponding virtual router.

21. The computing system of claim 15, wherein the method further comprises re-broadcasting the updates to the line cards by the routing table distribution application to ensure reliable delivery.

* * * * *